(12) United States Patent
Gu

(10) Patent No.: US 11,565,768 B1
(45) Date of Patent: Jan. 31, 2023

(54) PEDAL THICKNESS SUPPLEMENTARY DEVICE

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/749,116

(22) Filed: May 19, 2022

(51) Int. Cl.
*B62M 3/08* (2006.01)

(52) U.S. Cl.
CPC .................... *B62M 3/086* (2013.01)

(58) Field of Classification Search
CPC ................................ B62M 3/08; B62M 3/086
USPC ........................................................ 74/594.4
See application file for complete search history.

(56) References Cited

U.S. PATENT DOCUMENTS

| | | | | |
|---|---|---|---|---|
| 2003/0029270 A1* | 2/2003 | Milanowski | ............. | B62M 3/08 74/594.4 |
| 2008/0250896 A1* | 10/2008 | Lin | .......... | B62M 3/08 74/594.4 |
| 2009/0078081 A1* | 3/2009 | French | .......... | B62M 3/08 74/594.4 |
| 2009/0095122 A1* | 4/2009 | Weagle | .......... | B62M 3/08 74/560 |
| 2009/0158888 A1* | 6/2009 | Coderre | .......... | B62M 3/086 74/594.4 |
| 2014/0060242 A1* | 3/2014 | Thom | .......... | B62M 3/086 29/401.1 |
| 2016/0052593 A1* | 2/2016 | Lucchesi | .......... | B62M 3/086 74/594.4 |

FOREIGN PATENT DOCUMENTS

| | | | | |
|---|---|---|---|---|
| GB | 2536444 A | * | 9/2016 | ............. B62M 3/08 |
| WO | WO 2013123930 A1 | * | 8/2013 | ............. B62M 3/08 |

OTHER PUBLICATIONS

Define edge, Microsoft Bing, Oct. 13, 2022 (Year: 2022).*

* cited by examiner

*Primary Examiner* — Vinh Luong

(57) ABSTRACT

A pedal thickness supplementary device is provided. The pedal thickness supplementary device includes two supplementary assemblies and a plurality of fasteners. The two supplementary assemblies disposed on two corresponding sides of the pedal respectively, in which the two supplementary assemblies clamp and couple to the pedal, so that the thickness of the two supplementary assemblies clamping to the pedal is thicker than the thickness of the pedal. Further, each of the two supplementary assemblies includes two anti-slip portions, a plurality of first fasten grooves, a plurality of second fasten grooves and a through hole.

9 Claims, 11 Drawing Sheets

PEDAL THICKNESS SUPPLEMENTARY DEVICE

FIELD OF THE DISCLOSURE

The present disclosure relates to a pedal thickness supplementary device, and more particularly to a technology used in the bicycle field, mainly according to the riders of different age categories to adjust the thickness of the pedals and make the pedaling smoother and more effortless.

BACKGROUND OF THE DISCLOSURE

Bicycle is a kind of sports and fitness equipment that is very suitable for all ages. The bike size would be different for each age category. It is impossible for everyone to ride the same size of bicycle due to the differences of height and leg lengths in each person. Therefore, the general solution is to adjust the height of the saddle, so that the rider can step firmly on the pedal. However, when the rider is a growing child, the adjustment to the height of the saddle may not be able to let the child at every age category steady and fully step on the pedal with the ball of the foot. Specifically, when the saddle is too low, it will interfere with the control of the handlebars; when the saddle is too high, the rider can only reach the pedal with the toe. The above problems are likely to cause danger and unbalance while riding.

Accordingly, in the technical field of the present disclosure, there is a need to improve the use of bicycle for growing young children, so that young children can step on the pedals steadily, and ride smoothly.

SUMMARY OF THE DISCLOSURE

The main objective of the present disclosure is to provide a supplementary device for growing young children to step on the pedal smoothly and stably while riding, so that the children can pedal and ride smoothly. Further, the present disclosure improves disadvantage in the conventional art. During developmental stages of children, the adjusting to the bicycle for children would face to the problems which the legs of the user affect the control of the handlebars or unable to fully step on the pedals of the bicycle, and can only reach the pedal with toes, which makes it difficult to ride smoothly. Therefore, in order to achieve the above-mentioned objectives and effects, a pedal thickness supplementary device is provided. The pedal thickness supplementary device is mounted on two sides of a pedal, and the pedal thickness supplementary device includes: two supplementary assemblies, movably disposed on two corresponding sides of the pedal respectively, wherein the two supplementary assemblies clamp and couple to the pedal, so that the thickness of the two supplementary assemblies clamping to the pedal is thicker than the thickness of the pedal; wherein, each of the two supplementary assemblies includes two anti-slip portions, a plurality of first fasten grooves and a plurality of second fasten grooves; wherein, the two anti-slip portions are respectively located on two opposite sides of the supplementary assembly, the plurality of first fasten grooves are recessed in the edge of one anti-slip portion and spaced apart, and the plurality of the second fasten grooves are recessed in the edge of another anti-slip portion and corresponding to the first fasten grooves, and a through hole communicating each of the first fasten groove to the relative second fasten groove respectively; and a plurality of fasteners, threadedly assembling the two supplementary assemblies and clamping the pedal.

According to the above description, before riding the bicycle, the two supplementary assemblies can be coupled on the two sides of the pedal, and threadedly assembling the two supplementary assemblies with the plurality of fasteners, so that the two supplementary assemblies can clamp and couple the pedal. In this way, the thickness of the pedal is increased from the original thin piece to the thickness of the two supplementary assemblies and the pedal, so that the pedal thickness is adjustable for growing children in developmental stages and allows the feet of the growing children can step on the two supplementary assemblies stably and ride the bicycle smoothly and effortlessly.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
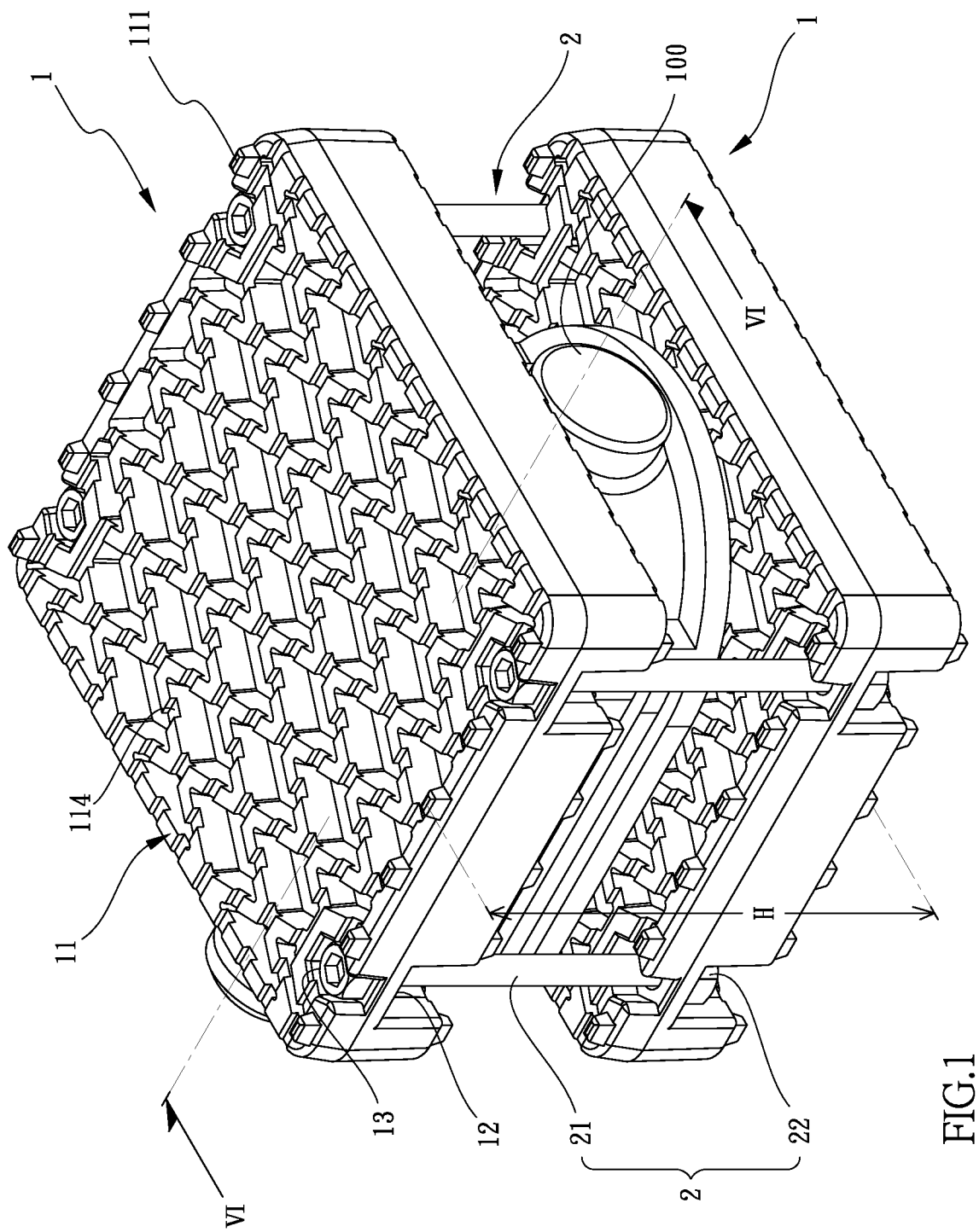
FIG. 1 is a schematic view of the first configuration of the pedal with the pedal thickness supplementary device of the present disclosure.
Figure 2:
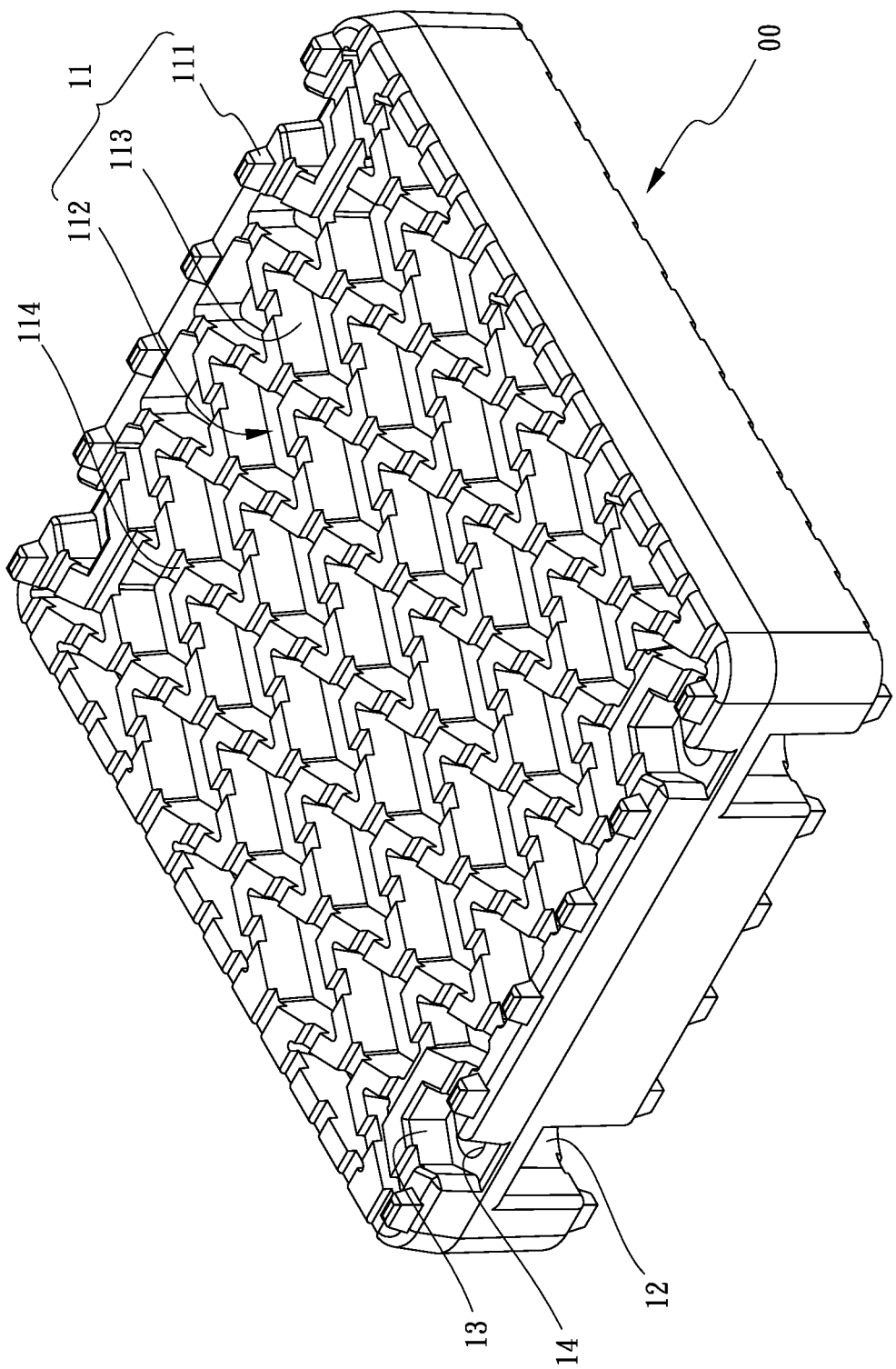
FIG. 2 is a perspective schematic view of a supplementary assembly of the present disclosure.
Figure 3:
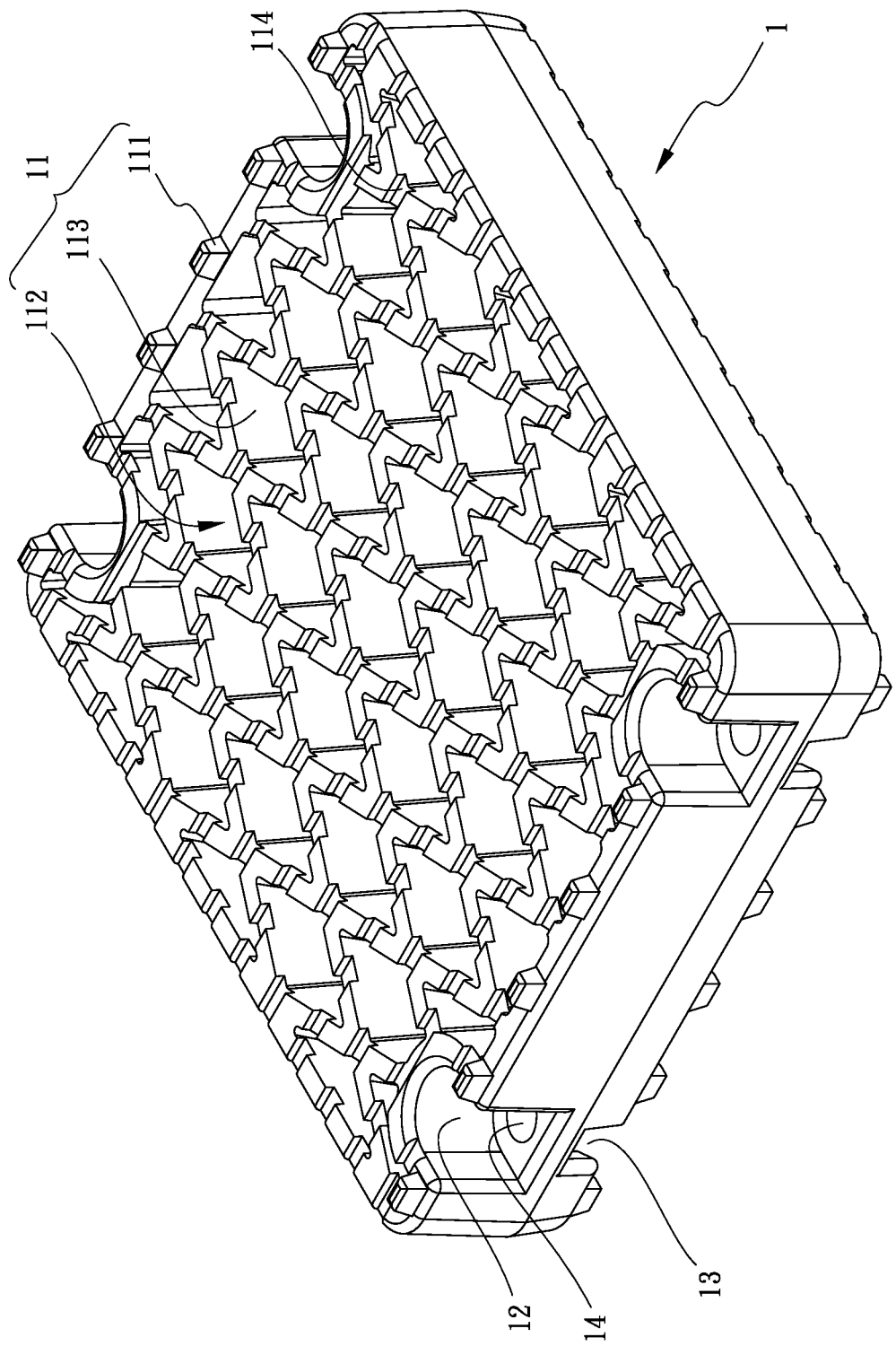
FIG. 3 is a perspective schematic view of another angle of FIG. 2.
Figure 4:
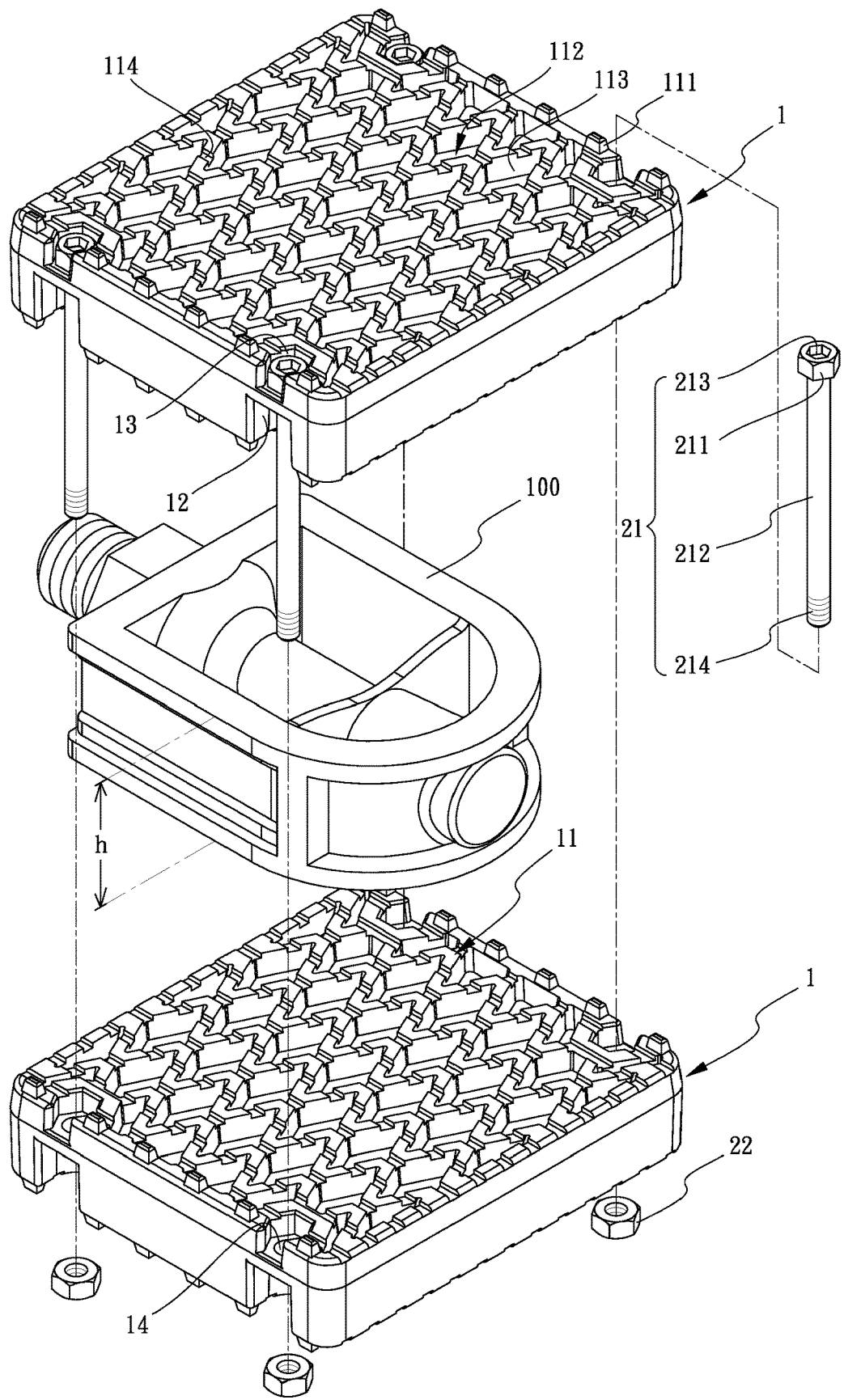
FIG. 4 is an exploded schematic view of FIG. 1.

Referring to FIG. 1 to FIG. 6, the present disclosure provides a pedal thickness supplementary device, disposed on two sides of a pedal 100. The pedal thickness supplementary device includes: two supplementary assemblies 1 in the rectangular sheet shape, movably disposed on two corresponding sides of the pedal respectively (the two sides of the pedal 100 refer to the parts of the pedal 100 for stepping on by foot), wherein the two supplementary assemblies 1 clamp and couple to the pedal 100, so that the thickness of the two supplementary assemblies 1 clamping to the pedal 100 is thicker than the thickness of the pedal 100 (the total thickness is H as shown in FIG. 1, the thickness of the pedal is h as shown in FIG. 4). Further, each of the two supplementary assemblies 1 includes two anti-slip portions 11, a plurality of first fasten grooves 12 and a plurality of second fasten grooves 13; wherein, the two anti-slip portions 11 are respectively located on two opposite sides of the supplementary assembly 1 and one anti-slip portion 11 faces toward the pedal 100 when assembling. The plurality of first fasten grooves 12 are recessed in the edge of one anti-slip portion 11 and spaced apart, and the plurality of the second fasten grooves 13 are recessed in the edge of another anti-slip portion 11 and corresponding to each of the plurality of first fasten grooves 12, and a through hole communicating each of the first fasten groove to the relative second fasten groove respectively; and a plurality of fasteners 2, threadedly assembling the two supplementary assemblies 1 for clamping the pedal 100. Moreover, each of the plurality of fasteners 2 further includes a plurality of bolts 21 and a plurality of nuts 22. When the two supplementary assemblies couple to the pedal, each of the plurality of nuts 22 is accommodated in the first fasten groove 12 or the second fasten groove 13 of one of the supplementary assembly 1, and each of the plurality of bolts 21 is inserted into the through hole 14 toward the nut 22 from the first fasten groove 12 or the second fasten groove 13 of another supplementary assembly 1, and the bolt 21 and the nut 22 are threadedly engaged together, so that the pedal 100 is clamped and coupled by the two supplementary assemblies 1 fixedly, and further the total thickness of the pedal 100 for stepping on is increased.

Figure 7:
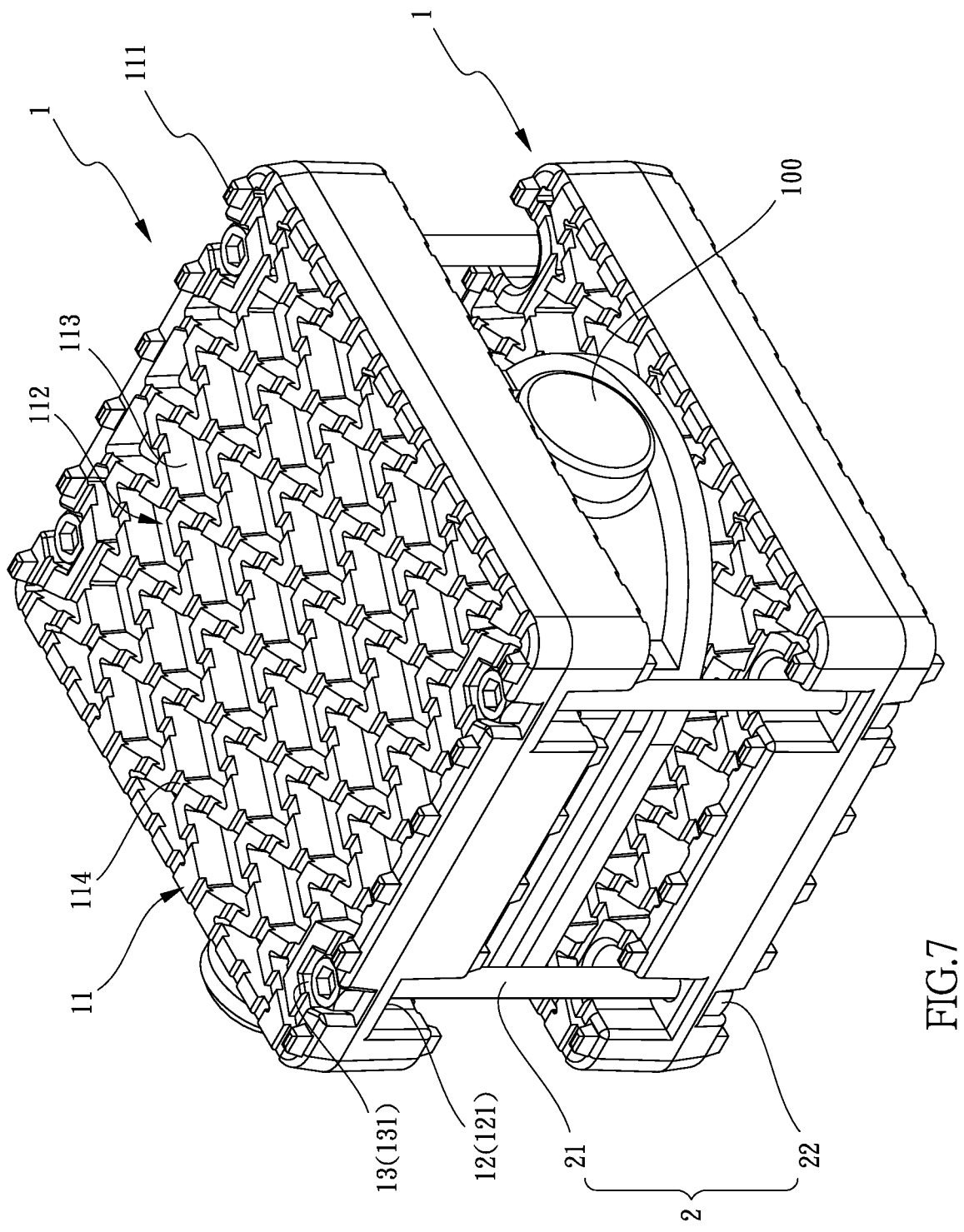
FIG. 7 is a schematic view of the second configuration of the pedal with the pedal thickness supplementary device of the present disclosure.
Figure 8:
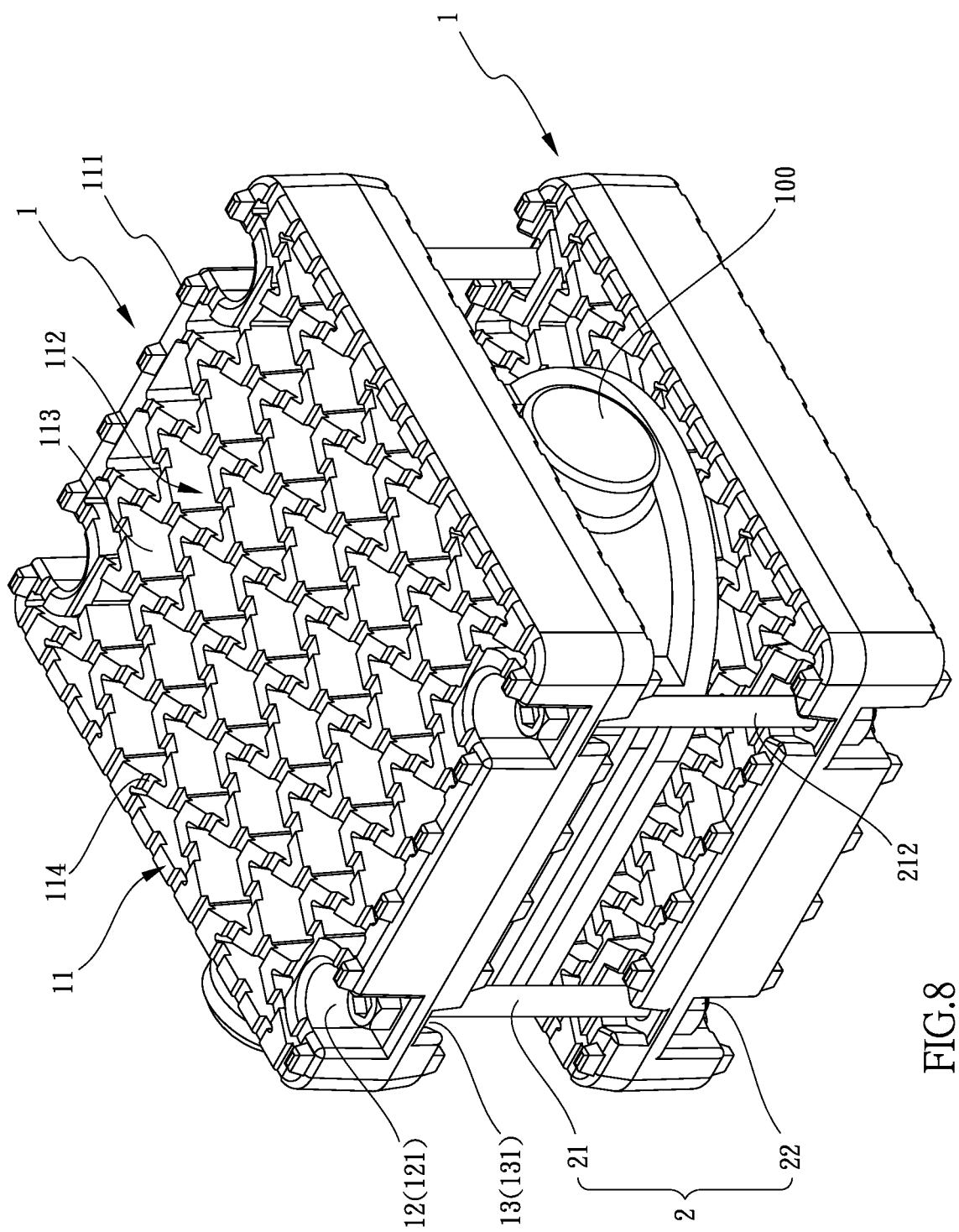
FIG. 8 is a schematic view of the third configuration of the pedal with the pedal thickness supplementary device of the present disclosure.

Conventionally, the thickness of the pedals of bicycles is fixed, which is difficult for growing young children to fully step on the pedals with the ball of their feet, and can only reach the pedals with the toes to ride. That is not easy to maintain the balance and not smooth when riding, and even extremely laborious. Therefore, the present disclosure provides the assembling of the two supplementary assemblies and the fastener 2 to solve the above problems. The user can choose the side of the two supplementary assemblies according to legs length, comfort, shape of the pedal 100, etc. Referring to FIG. 1, FIG. 7 and FIG. 8, the two supplementary assemblies clamp and couple the pedal in different configurations that the first fasten groove 12 of one supplementary assembly 1 corresponding the first fasten groove 12 of another supplementary assembly 1, the first fasten groove 12 of one supplementary assembly 1 corresponding the second fasten groove 13 of another supplementary assembly 1, or the second fasten groove 13 of one supplementary assembly 1 corresponding the second fasten groove 13 of another supplementary assembly 1. (The above-mentioned various configurations are mainly used for cooperating and hiding the different sizes of bolts 21 and nuts 22, so that to prevent the protrude fastener from affecting riding) After deciding the configuration, one supplementary assembly 1 is placed on one side of the pedal 100, the bolts 21 is inserted into the first fasten groove 12 or the second fasten groove 13, another supplementary assembly 1 is placed on another side of the pedal 100, and each of the plurality of nuts 22 and each of the plurality of bolts 21 are threadedly engaged respectively. In this way, the assembly of the two supplementary assemblies 1 and the pedal 100 is completed, and the assembly method is not limited in the present disclosure, which can be different assembly steps according to the user's habit and fluency of work. The use of examples including examples of any terms is illustrative only, and in no way limits the scope and meaning of the present disclosure or of any exemplified term.

Figure 5:
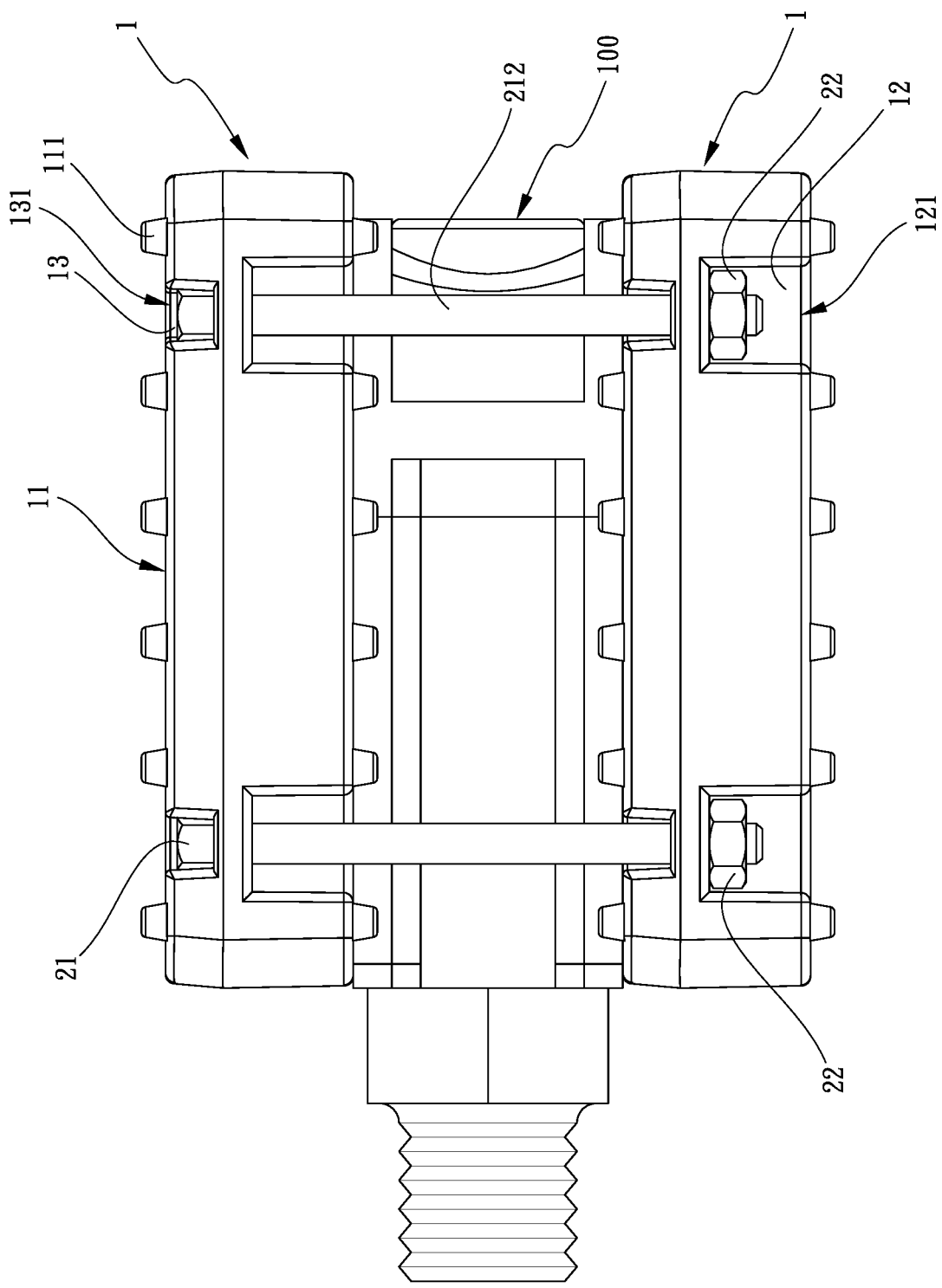
FIG. 5 is a planar schematic view of FIG. 1.
Figure 6:
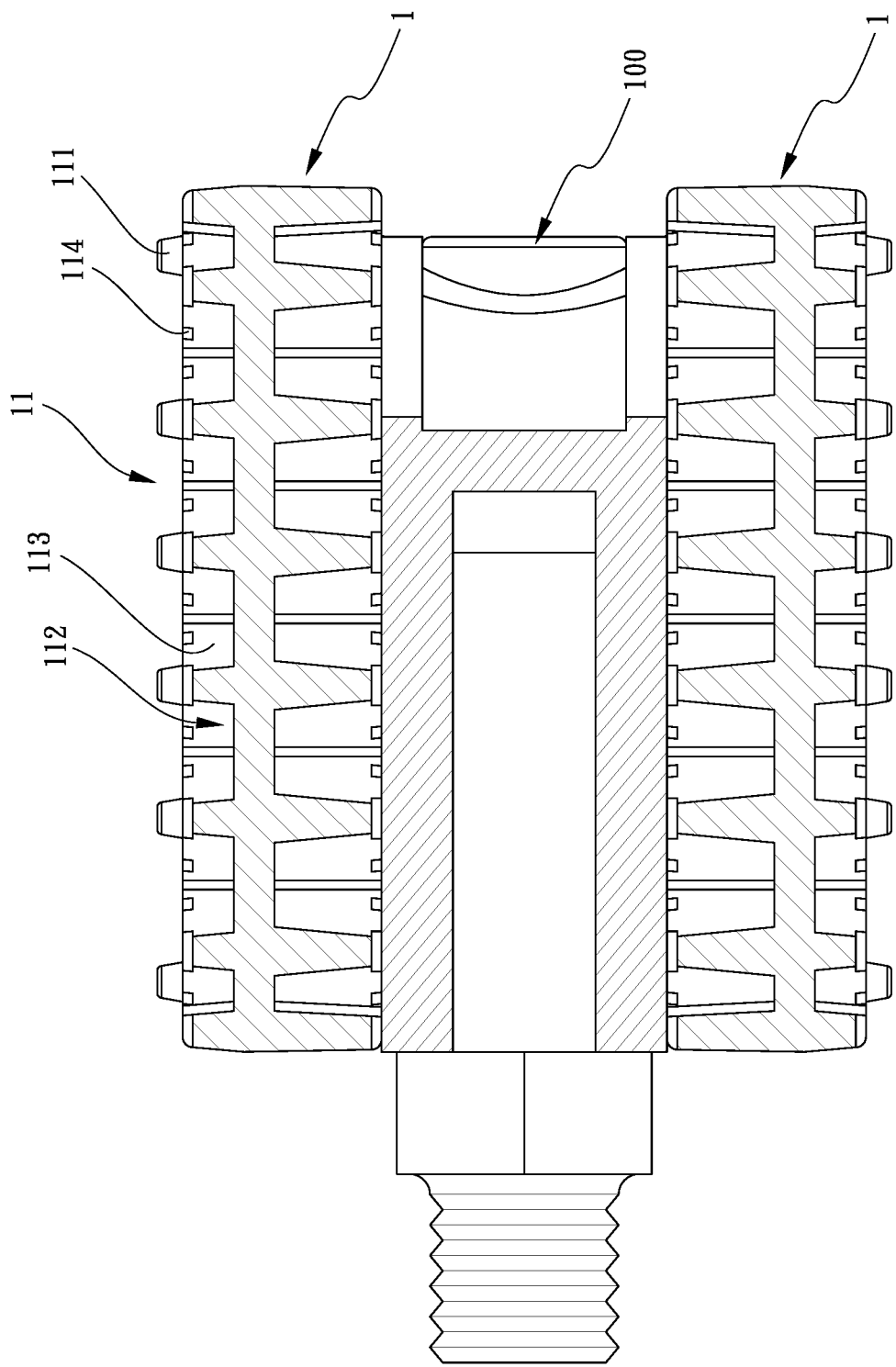
FIG. 6 is a sectional schematic view of line VI-VI of FIG. 1.

In order to prevent the pedal 100 from detaching from the two supplementary assemblies 1, each of the anti-slip portions 11 further includes a plurality of shielding protrusions 111. As shown in FIG. 4 and FIG. 5, the plurality of shielding protrusions 111 dispersive disposed on the surrounding edge of the anti-slip portion 11, and the plurality of shielding protrusions 111 are spaced apart. Moreover, the area of the anti-slip portion 11 of the supplementary assembly 1 is larger than the area of the pedal 100, so that the pedal 100 is surrounded and limited in the area by the plurality of shielding protrusions 111. That is to say, the pedal 100 is not only fixed by threadedly engagement of the plurality of bolts 21 and the plurality of nuts 22, but also fixed in position by the plurality of shielding protrusions 111.

Figure 9:
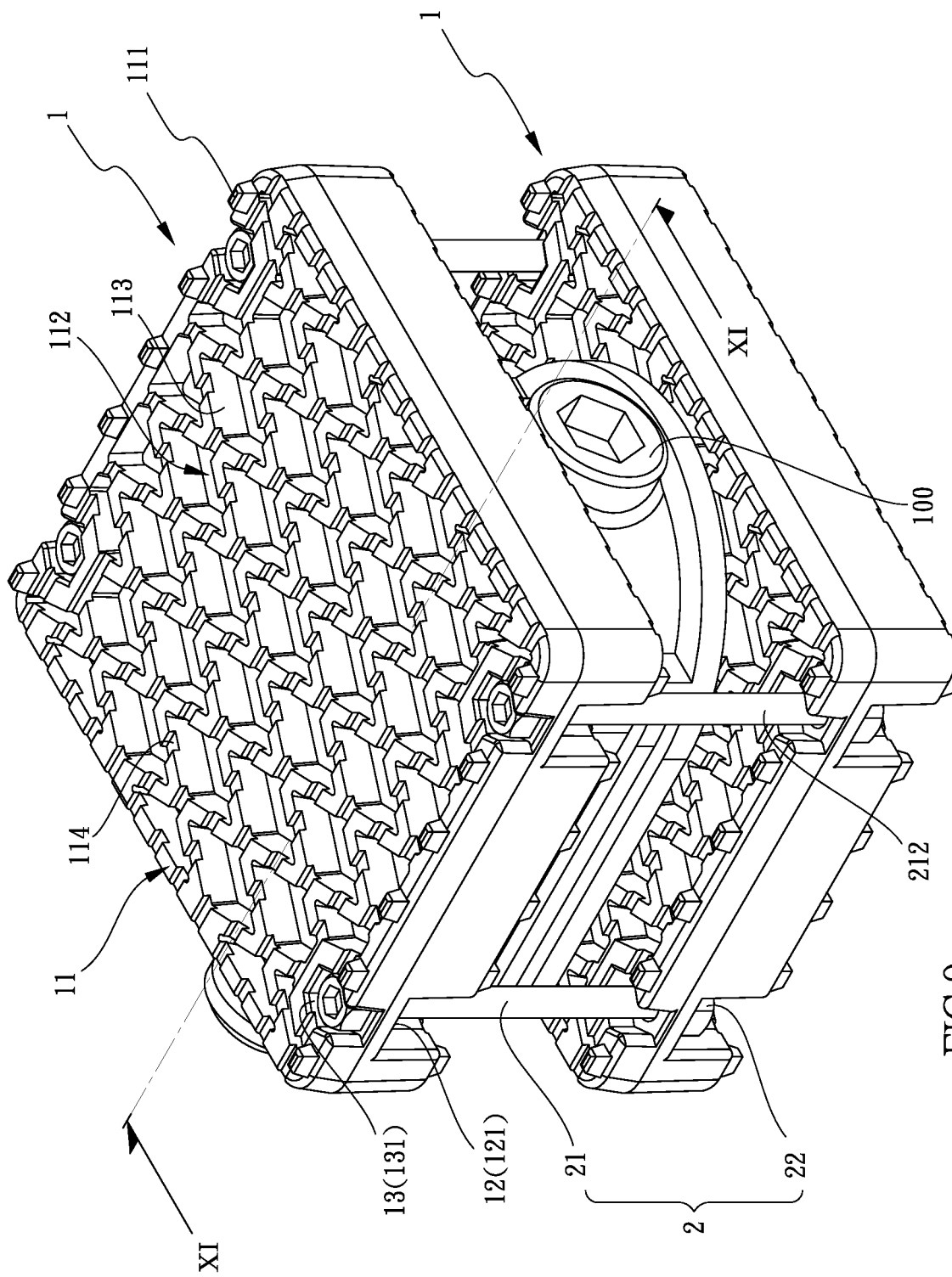
FIG. 9 is a schematic view of the fourth configuration of the pedal with the pedal thickness supplementary device of the present disclosure.
Figure 10:
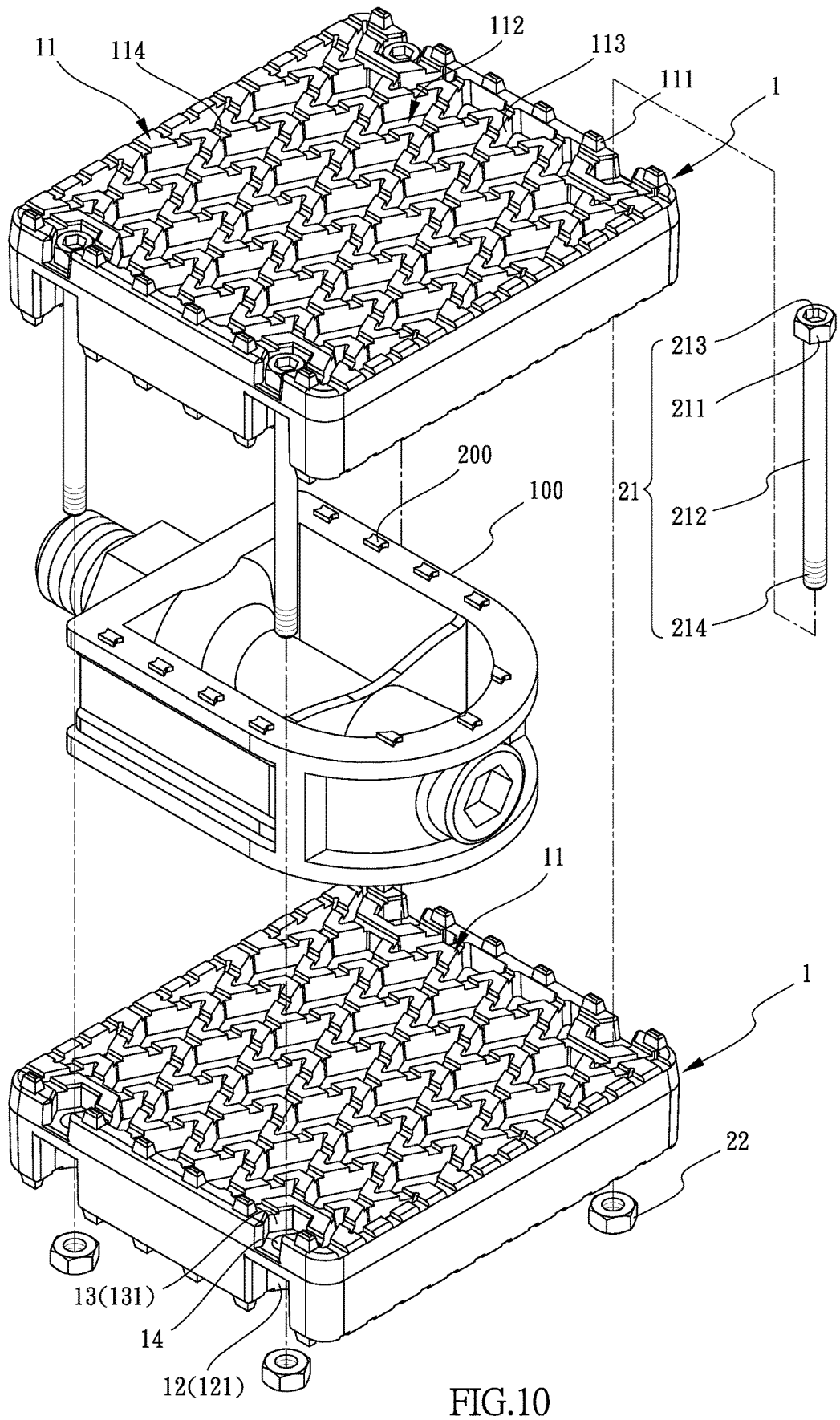
FIG. 10 is an exploded perspective schematic view of FIG. 9.
Figure 11:
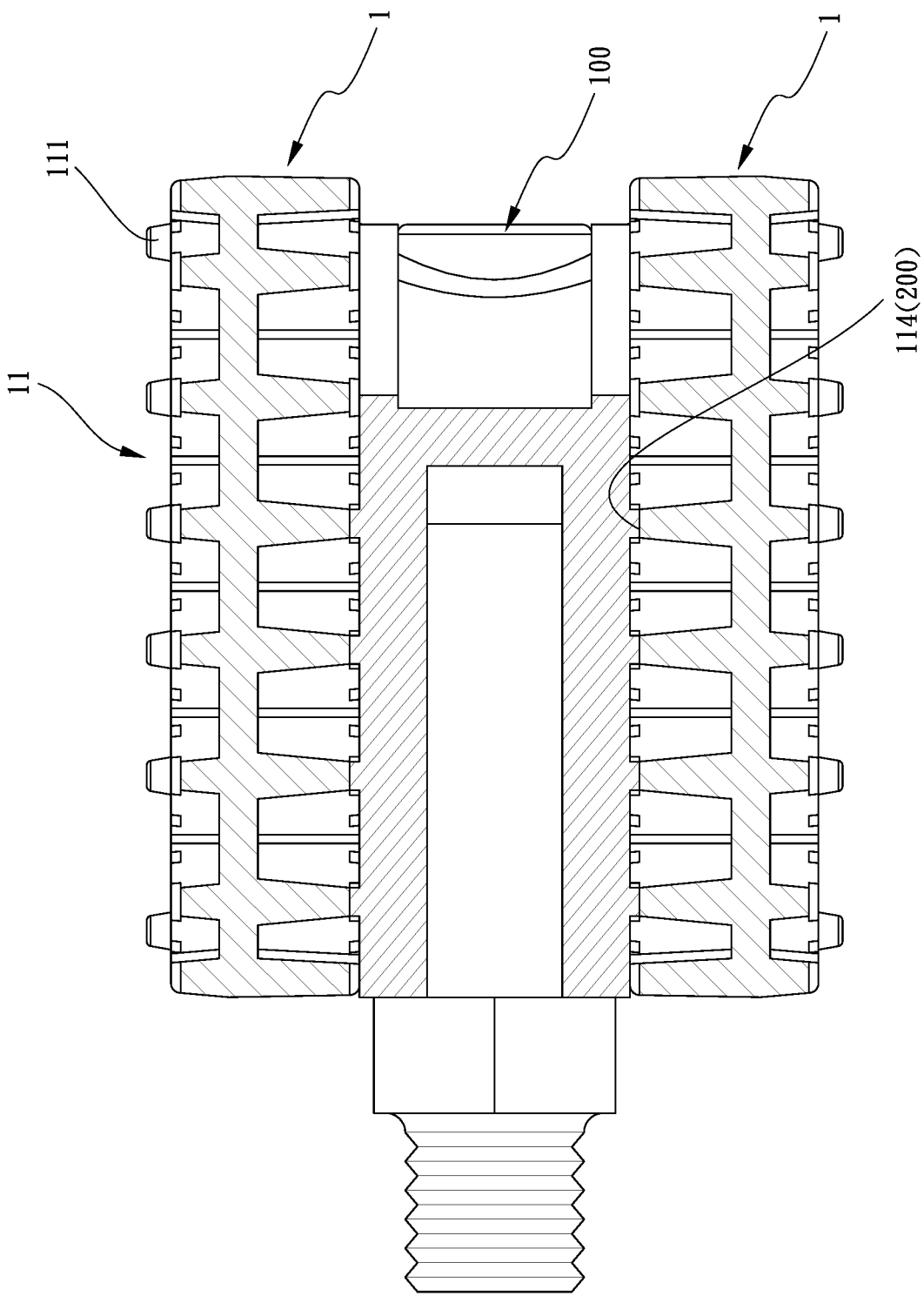
FIG. 11 is a sectional schematic view of line XI-XI of FIG. 9.

Furthermore, two embodiments to achieve anti-slip and prevent disassembly are also provided by the present disclosure. Firstly, referring to FIG. 4 and FIG. 6, the frictional resistance can be provided through the material properties of the pedal 100 and the anti-slip portions 11 of the two supplementary assemblies 1, and by the mutual engagement between the pedal 100 and the two supplementary assemblies 1. In combination with the plurality of shielding protrusions 111, threadedly engagement of the bolts 21 and the nuts 22, the pedal 100 can be immovably fixed by the two supplementary assemblies 1. Secondly, referring to FIG. 9 to FIG. 11, the present disclosure further includes a plurality of rhombus holes 112 through the two anti-slip portions 11 of the supplementary assembly 1. In detail, the plurality of rhombus holes 112 are arranged spaced apart and form a plurality of fins 113 connected to each other, and each of the top and bottom sides of the fins 113 has a retaining groove 114 engaged with the pedal. The supplementary assembly 1 is suitable for the pedal 100 with anti-slip protrusions 200. Each of the anti-slip protrusions 200 can be attached in the retaining groove 114 or abutted on the wall of the rhombus hole 112, in combination with the plurality of shielding protrusions 111, threadedly engagement of the bolts 21 and the nuts 22, the engagement between the two supplementary assemblies 1 and the pedal 100 will not sway or disassemble by the force of the rider stepping on the pedal.

Regarding to the first fasten groove 12 and the second fasten groove 13, in order to match the bolts 21 and the nuts 22, and avoid the bolts 21 excess the supplementary assembly, the groove depth of the first fasten groove is greater than the groove depth of the second fasten groove. Further, the groove shape of the first fasten groove 12 is a U-shape with a first opening 121 on one side; and the groove shape of the second fasten 13 groove is a hexagonal shape with a second opening 131 on one side. The first opening 121 and the second opening 131 are provided mainly for the convenience of the user to move and take out the nuts 22 accommodated in the groove. Each of the plurality of bolts 21 further includes a bolt head portion 211 and a bolt body portion 212, in which the bolt head portion 211 is relative to the groove shape of the first fasten groove 12, and the shape of the bolt head portion 211 is a cylinder with a driving groove 213 recessed in the top that allows the bolt 21 to be turned with a hand tool. The bolt body portion 212 is connected to the bottom of the bolt head portion 213 and has an external screw thread segment 214 that can be threadedly engaged with the nut 22. Moreover, the nut is in a hexagonal shape. As shown in the configuration of the two supplementary assemblies 1 in FIG. 1, when the nut 22 is accommodated in the second fasten groove 13, the nut 22 is abutted on the groove wall, so that the nut 22 will not twist with the torque of bolt 21, and threadedly fixed the fastener. In other embodiments, the configurations of the two supplementary assemblies 1 are mostly provided with the nuts 22 being accommodated in the second fasten grooves 13, and the bolts 21 can be inserted into the first fasten groove 12 or the second fasten groove 13 and threadedly engaged with the nuts 22. Therefore, the nuts 22 being accommodated in the second fasten grooves 13 avoids the nuts 22 twisting with the threadedly engagement of bolt 21.

What is claimed is:

1. A pedal thickness supplementary device comprising:
two supplementary assemblies, movably disposed on two corresponding sides of the pedal respectively; wherein the two supplementary assemblies clamp and couple to the pedal, so that the thickness of the two supplementary assemblies clamping to the pedal is thicker than the thickness of the pedal; wherein, each of the two supplementary assemblies includes two anti-slip portions, a plurality of first fasten grooves and a plurality of second fasten grooves; wherein, the two anti-slip portions are respectively located on two opposite sides of the supplementary assembly, the plurality of first fasten grooves are recessed in the edge of one anti-slip portion and spaced apart, and the plurality of the second fasten grooves are recessed in the edge of another anti-slip portion and corresponding to the first fasten grooves, and a through hole communicating each of the first fasten groove to the relative second fasten groove respectively; and
a plurality of fasteners, threadedly assembling the two supplementary assemblies and clamping the pedal.

2. The pedal thickness supplementary device according to claim 1, wherein the area of the anti-slip portion is larger than the area of the pedal; wherein each of the anti-slip portions further includes a plurality of shielding protrusions dispersive disposed on the surrounding edge of the anti-slip portion and spaced apart.

3. The pedal thickness supplementary device according to claim 1, further including a plurality of rhombus holes through the two anti-slip portions of the supplementary assembly; wherein the rhombus holes are arranged spaced apart and form a plurality of fins connected to each other, and the top and bottom sides of each of the fins has a retaining groove engaged with the pedal.

4. The pedal thickness supplementary device according to claim 2, further including a plurality of rhombus holes through the two anti-slip portions of the supplementary assembly; wherein the rhombus holes are arranged spaced apart and form a plurality of fins connected to each other, and the top and bottom sides of each of the fins has a retaining groove engaged with the pedal.

5. The pedal thickness supplementary device according to claim 1, wherein the groove depth of the first fasten groove is greater than the groove depth of the second fasten groove.

6. The pedal thickness supplementary device according to claim 5, wherein the groove shape of the first fasten groove is a U-shape with a first opening on one side; and the groove shape of the second fasten groove is a hexagonal shape with a second opening on one side.

7. The pedal thickness supplementary device according to claim 6, wherein each of the plurality of fasteners further includes a plurality of bolts and a plurality of nuts; wherein, when the two supplementary assemblies clamp and couple to the pedal, each of the plurality of nuts is accommodated in the first fasten groove or the second fasten groove of one of the supplementary assemblies, and each of the plurality of bolts is inserted into the through hole toward the nut from the first fasten groove or the second fasten groove of another supplementary assembly, and the nut and the bolt are threadedly engaged together.

8. The pedal thickness supplementary device according to claim 7, wherein each of the plurality of bolts further includes a bolt head portion and a bolt body portion; wherein the bolt head portion is relative to the groove shape of the first fasten groove, and the shape of the bolt head portion is a cylinder with a driving groove recessed in the top, the bolt body portion is connected to the bottom of the bolt head portion and has an external screw thread segment for threadedly engaging with the nut; wherein, the nut is a hexagonal shape relative to the groove shape of the second fasten groove; wherein when the nut is accommodated in the second fasten groove, the nut is abutted on the groove wall.

9. The pedal thickness supplementary device according to claim 5, wherein the two supplementary assemblies clamp and couple the pedal in a configuration that the first fasten groove of one supplementary assembly corresponding the first fasten groove of another supplementary assembly, the first fasten groove of one supplementary assembly corresponding the second fasten groove of another supplementary assembly, or the second fasten groove of one supplementary assembly corresponding the second fasten groove of another supplementary assembly.

* * * * *